United States Patent
Kaneko

(10) Patent No.: US 11,430,149 B2
(45) Date of Patent: Aug. 30, 2022

(54) IMAGE PROCESSING DEVICE AND IMAGE PROCESSING METHOD

(71) Applicant: CLARION CO., LTD., Saitama (JP)

(72) Inventor: Takayuki Kaneko, Saitama (JP)

(73) Assignee: CLARION CO., LTD., Saitama (JP)

( * ) Notice: Subject to any disclaimer, the term of this patent is extended or adjusted under 35 U.S.C. 154(b) by 197 days.

(21) Appl. No.: 16/782,759

(22) Filed: Feb. 5, 2020

(65) Prior Publication Data

US 2020/0265605 A1 Aug. 20, 2020

(30) Foreign Application Priority Data

Feb. 14, 2019 (JP) .............................. JP2019-024147

(51) Int. Cl.
  *G06T 7/73* (2017.01)
  *B60R 11/04* (2006.01)

(52) U.S. Cl.
  CPC ............... *G06T 7/73* (2017.01); *B60R 11/04* (2013.01); *B60R 2300/105* (2013.01); *B60R 2300/806* (2013.01); *G06T 2207/30264* (2013.01)

(58) Field of Classification Search
  USPC ....................................................... 382/104
  See application file for complete search history.

(56) References Cited

U.S. PATENT DOCUMENTS

| | | | |
|---|---|---|---|
| 9,393,869 B2* | 7/2016 | Oiki ..................... | B60W 30/06 |
| 9,399,400 B2* | 7/2016 | Morimoto ............ | B62D 15/027 |
| 9,457,806 B2* | 10/2016 | Hayakawa ............. | B60K 28/00 |
| 9,616,885 B2* | 4/2017 | Hayakawa ............. | B60W 30/06 |
| 9,734,581 B2* | 8/2017 | Muramatsu .............. | G06T 7/70 |
| 10,733,889 B2* | 8/2020 | Kurotobi ................ | G08G 1/141 |

(Continued)

FOREIGN PATENT DOCUMENTS

| | | |
|---|---|---|
| EP | 2 927 076 | 10/2015 |
| JP | 3-99952 | 4/1991 |

(Continued)

OTHER PUBLICATIONS

Zhang et al., Vision-Based Parking-Slot Detection: A DCNN-Based Approach and Large-Scale Benchmark Dataset, 2018 IEEE 1057-7149, pp. 5350-5363. (Year: 2018).*

(Continued)

*Primary Examiner* — Ishrat I Sherali
(74) *Attorney, Agent, or Firm* — Wenderoth, Lind & Ponack, L.L.P.

(57) ABSTRACT

An image processing device is equipped with a marker detector, an oblique line detector, and a parking frame detector. The marker detector extracts, from an image, positive and negative edge segments that are aligned next to each other at a predetermined interval as a pair, and detects a parking space division marker based on the pair. The oblique line detector detects an edge on one side of an edge segment (single-edge segment) that is not extracted as the pair, and detects a presumed straight line based on the single-edge segment connected with an oblique line. The parking frame detector detects neighboring edge segments based on the positive and negative edge segments as well as the single-edge segment of the presumed straight line, and detects a parking space based on a distance between the neighboring edge segments.

9 Claims, 10 Drawing Sheets

(56) References Cited

U.S. PATENT DOCUMENTS

| | | | | |
|---|---|---|---|---|
| 10,810,446 | B2* | 10/2020 | Hayakawa | G06T 7/136 |
| 10,896,336 | B2* | 1/2021 | Yamamoto | G08G 1/143 |
| 11,017,246 | B2* | 5/2021 | Kaneko | G06T 7/62 |
| 2015/0291030 | A1 | 10/2015 | Oiki et al. | |
| 2015/0291031 | A1* | 10/2015 | Morimoto | G06K 9/00812 |
| | | | | 701/70 |
| 2015/0302574 | A1* | 10/2015 | Muramatsu | B62D 15/0275 |
| | | | | 348/148 |
| 2015/0339535 | A1* | 11/2015 | Utagawa | G06T 7/246 |
| | | | | 348/118 |
| 2021/0357666 | A1* | 11/2021 | Kaneko | G06K 9/00812 |

FOREIGN PATENT DOCUMENTS

| | | |
|---|---|---|
| JP | 2003-118522 | 4/2003 |
| JP | 2012-210864 | 11/2012 |
| JP | 2013-18406 | 1/2013 |

OTHER PUBLICATIONS

Lee et al., Directional-DBSCAN: parking-slot Detection using a clustering Method in Around-view Monitoring System, 2016 IEEE 978-1-5090-1821-5/16, pp. 349-354. (Year: 2016).*
Hamada et al., Surround View based Parking Lot Detection and Tracking, 2015 IEEE 978-1-4673-7266, pp. 1106-1111. (Year: 2015).*
Extended Search Report dated Jul. 7, 2020 in corresponding European Patent Application No. 20153451.8.

* cited by examiner

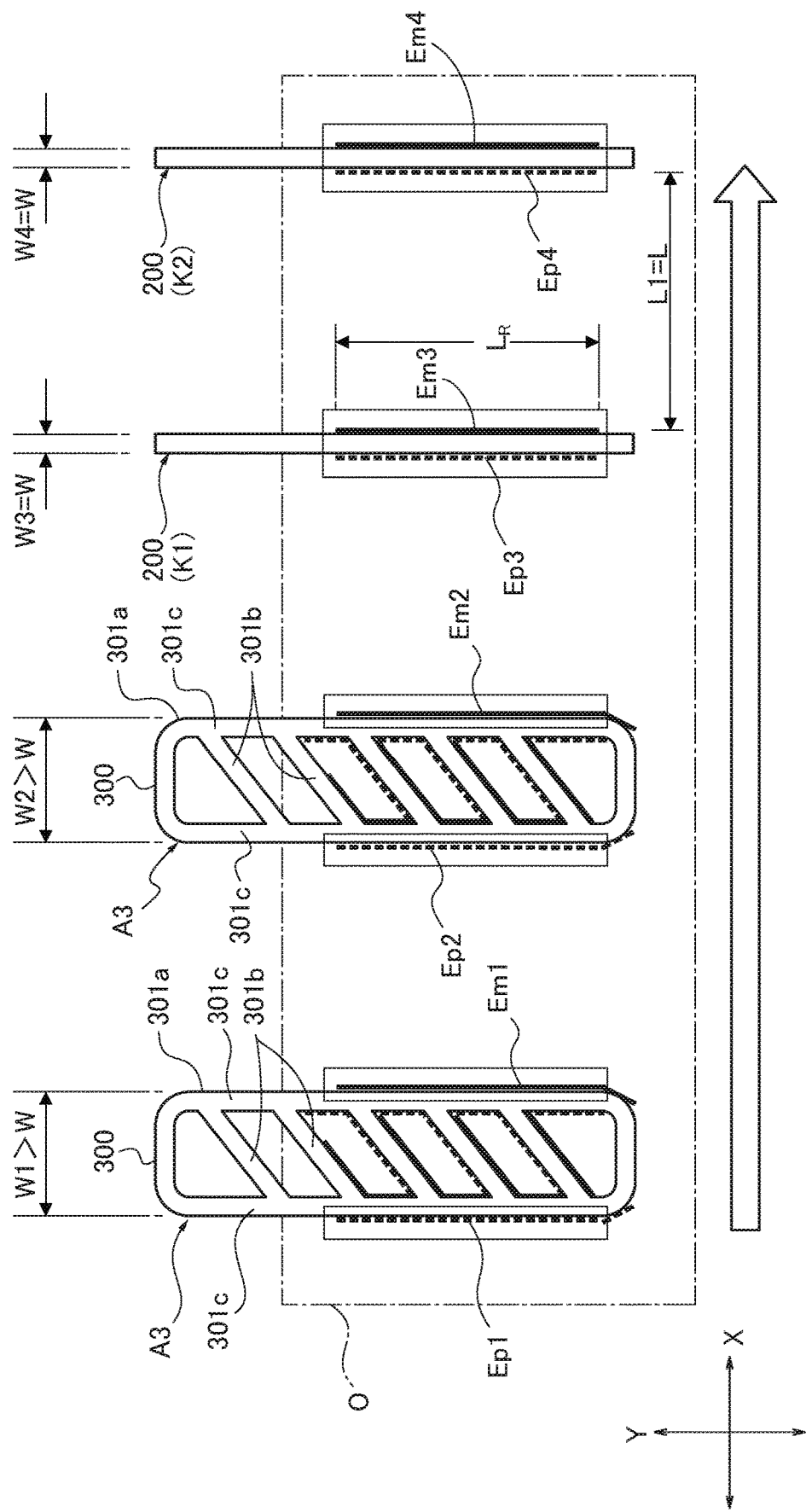

IMAGE PROCESSING DEVICE AND IMAGE PROCESSING METHOD

CROSS-REFERENCE TO RELATED APPLICATION

The present application is based on and claims a priority benefit of Japanese patent application No. 2019-024147, filed on Feb. 14, 2019, the disclosure of which is hereby incorporated herein by reference in its entirety.

BACKGROUND

This disclosure relates to an image processing device and an image processing method. The image processing device and the image processing method are configured to determine a parking frame based on an image signal outputted from an imaging device for imaging a road surface around a vehicle.

A parking assist apparatus has been provided by, for example, JP2013-018406A. The parking assist apparatus thereof is configured: to select one of parking-frame-like shapes displayed on a monitor in response to an input from a user; to detect a parking frame from a camera image based on the selected parking-frame-like shape; and to guide the vehicle to the parking space based on the detected parking frame. With this apparatus, a user such as a driver of the vehicle must manually select a parking-frame-like shape.

JP2012-210864A teaches another parking assist apparatus. The parking assist apparatus thereof is configured: to automatically detect a parking frame in a parking lot by extracting an edge of a marker, which is drawn on a road surface and corresponds to an edge of the parking frame; and to display information related to the detected parking frame on a monitor, or alternatively to provide the information (data) to a controller for devices such a sonar and a steering device of the vehicle, thereby assisting parking of the vehicle to the parking frame.

In some parking lots, a no-parking/stopping area, in which a vehicle is not allowed to enter, stop, and park, is provided next to a parking space. Such a no-parking/stopping area is drawn on a road surface with a plurality of oblique lines in parallel (hereinafter, no-parking/stopping area may also be referred to "oblique line area"). In the parking lot, a space between an oblique line area and a parking space division line and/or a space between two oblique line areas may also be available as a parking space.

SUMMARY

The parking assist apparatus of JP2012-210864A is configured to selectively extract an oblique edge inclined by a reference angle with respect to a lateral direction of an image captured by a left-side camera, and to recognize an image representing a parking frame based on the extracted oblique edge. Therefore, an edge extracted by the apparatus of JP2012-210864A in an oblique line area becomes extremely short, and it makes the apparatus difficult to recognize the oblique line area. That is, the apparatus of JP2012-210864A may not be capable of appropriately detecting a parking space provided next to the oblique line area.

An object of the present disclosure is, therefore, to provide an image processing device and an image processing method capable of detecting a parking space on a road surface promptly and accurately.

To achieve the above object, an embodiment of an image processing device described in the present disclosure comprises a marker detector, an oblique line detector, and a parking frame detector. The marker detector is configured to: scan an image generated by an image signal in a predetermined direction, the image signal being captured by an imaging device for imaging a road surface around a vehicle, detect a first edge segment at which the image signal increases by a predetermined value or more and a second edge segment at which the image signal decreases by a predefined value or more, filter the detected first edge segment and the detected second edge segment with a reference length, extract the filtered first edge segment and the filtered second edge segment that are aligned next to each other at a predetermined interval as a pair, and detect a parking space division marker based on the extracted pair. The oblique line detector is configured to: select the filtered first edge segment and the filtered second edge segment that are not extracted as the pair, define the selected edge segment as a single-edge segment, scan the image from a scanning start point on one side of the single-edge segment in a direction along the single-edge segment to determine an existence of an oblique line, detect a straight line based on the single-edge segment connected with the oblique line, and assign the detected straight line as a presumed straight line that forms a marker having the oblique line. The parking frame detector is configured to: detect neighboring edge segments aligned next to each other based on the first edge segment and the second edge segment of the parking space division marker as well as the single-edge segment of the presumed straight line, and to detect a parking space based on a distance between the detected neighboring edge segments.

BRIEF DESCRIPTION OF DRAWINGS

FIG. 8 is an explanatory view for explaining operations performed by the image processing device according to an embodiment of the present disclosure.

DETAILED DESCRIPTION

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

Schematic Configuration of Parking Assist Apparatus

Hereinafter, embodiments of the present disclosure will be described with reference to the drawings.

Figure 1:
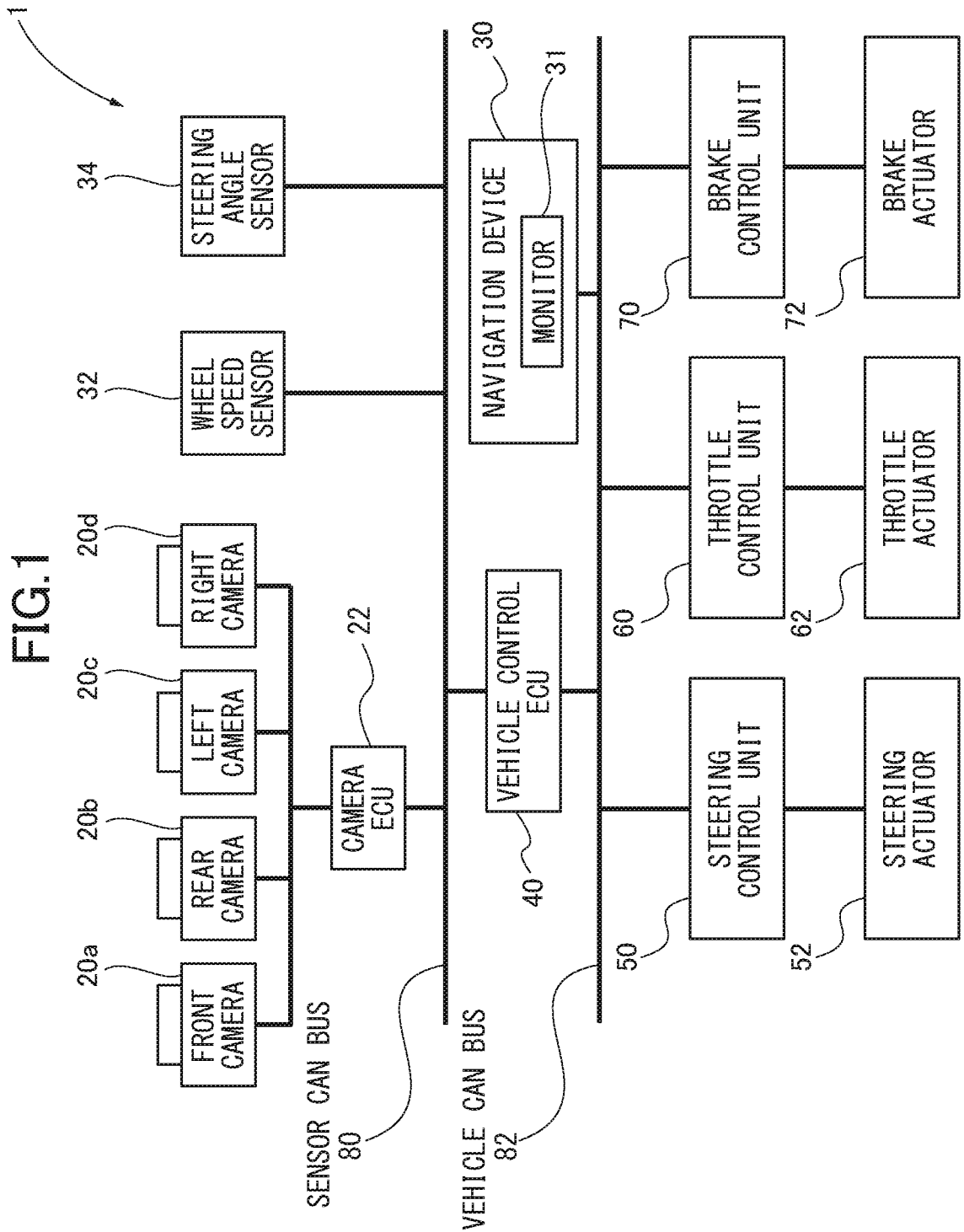
FIG. 1 is a block diagram showing a schematic configuration of a parking assist apparatus to which an embodiment of an image processing device of the present disclosure is applied.

As illustrated in FIG. 1, a parking assist apparatus 1 is installed in a vehicle V (shown in FIG. 2) to carry out a parking assist operation. Specifically, the parking assist apparatus 1 is configured to detect a parking frame available for parking the vehicle V. The parking assist apparatus 1 then controls the vehicle V to be parked in the detected parking frame.

Figure 2:
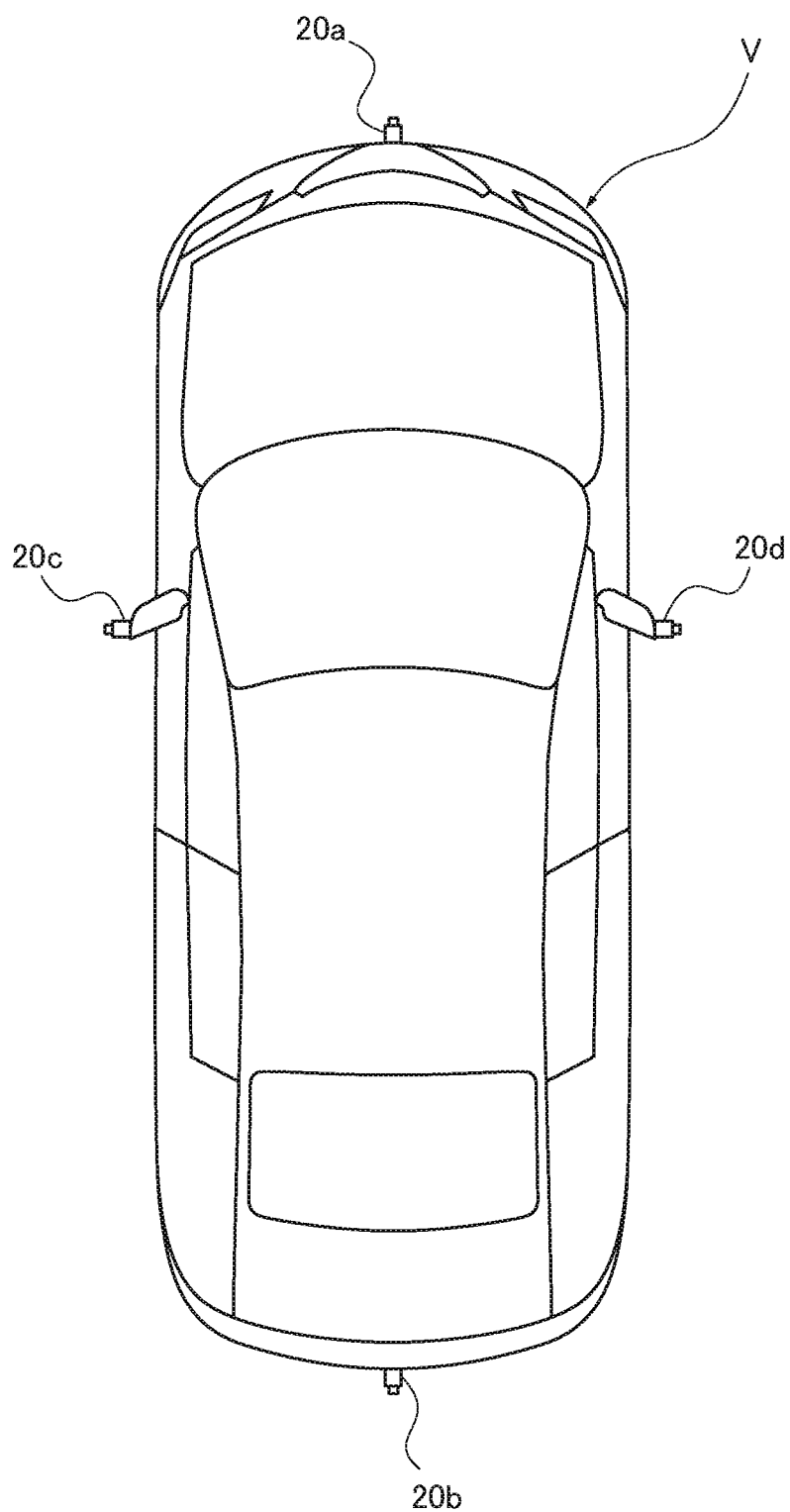
FIG. 2 is a schematic view showing an example of a displacement of imaging devices provided to the parking assist apparatus.

As illustrated in FIG. 2, the vehicle V is provided with a plurality of small cameras (imaging devices) installed at the front, back and both sides thereof.

To be specific, a front camera 20a is installed at the front bumper of or the radiator grill of the vehicle V to capture an image in front of the vehicle. A rear camera 20b is installed at the rear bumper of or the rear garnish of the vehicle V to capture an image behind the vehicle V. A left camera 20c is installed at the left-wing mirror of the vehicle V to capture a side view image on the left of the vehicle V. A right camera 20d is installed at the right-wing mirror of the vehicle V to capture a side view image on the right of the vehicle V.

The front camera 20a, rear camera 20b, left camera 20c, and right camera 20d each have a wide-angle lens or a fisheye lens capable of monitoring a wide range. With the four cameras, the apparatus is able to monitor the omnidirectional area of the vehicle V including the road surface. The imaging device of the apparatus is configured with the four cameras 20a-20d to image the road surface around the vehicle V. Hereinafter, the four cameras 20a-20d may collectively be referred to as the "cameras 20".

As illustrated in FIG. 1, the parking assist apparatus 1 includes, in addition to the cameras 20, a camera ECU 22, a navigation device 30, a wheel speed sensor 32, and a steering angle sensor 34.

The camera ECU 22 is configured mainly with a microcomputer including a Central Processing Unit (CPU), a Read Only Memory (ROM), a Random Access Memory (RAM), a flash memory, and the like. The camera ECU 22 controls the cameras 20. Further, the camera ECU 22 is configured to realize, based on the information acquired by the cameras 20, processes such as generating an overhead image, detecting a parking frame, and determining whether the detected parking frame is available for the vehicle to be parked.

The navigation device (display) 30 is equipped with a monitor 31 to display images and a memory in which mapping data and the like is stored for navigation. The navigation device 30 navigates the vehicle V to a target point determined by a user of the navigation device 30 based on the stored mapping data and a current position of the vehicle detected by a GPS or the like (not illustrated). Images during the navigation process are displayed on the monitor 31.

The wheel speed sensor 32 detects a wheel speed of the vehicle V. The information detected by the wheel sensor 32 (i.e., wheel speed or rotation speed) is inputted to a vehicle control unit (vehicle ECU) 40.

The steering angle sensor 34 detects a steering angle of the vehicle V. When the vehicle V travels straight, the steering angle sensor 34 reads zero degree (i.e., neutral position). The steering angle sensor 34 outputs a rotation angle with respect to the neutral position as a steering angle. The information (steering angle) detected by the steering angle sensor 34 is inputted to the vehicle ECU 40.

The parking assist apparatus 1 includes the vehicle ECU 40, as well as a steering control unit 50, a throttle control unit 60, and a brake control unit 70.

The vehicle ECU 40 is configured mainly with a microcomputer including a Central Processing Unit (CPU), a Read Only Memory (ROM), a Random Access Memory (RAM), a flash memory, and the like. The vehicle ECU 40 is configured to realize various processes for assisting the vehicle V to be parked based on the detected information inputted from the camera ECU 22, the wheel speed sensor 32, and the steering angle sensor 34.

For example, when a driver presses a switch (not illustrated) to activate the parking assist apparatus 1 in order to initiate the automatic parking, the vehicle ECU 40 realizes an automatic parking process to automatically park the vehicle V at the parking frame after the camera ECU 22 determines the availability of the parking frame.

The steering control unit 50 drives a steering actuator 52 to control the steering angle of the vehicle V based on the information obtained by and determined by the vehicle ECU 40.

The throttle control unit 60 drives a throttle actuator 62 to control the throttle valve of the vehicle V based on the information obtained by and determined by the vehicle ECU 40.

The brake control unit 70 drives a brake actuator 72 to control the brake of the vehicle V based on the information obtained by and determined by the vehicle ECU 40.

The camera ECU 22, the wheel speed sensor 32, and the steering angle sensor 34 are connected with the vehicle ECU 40 via a sensor Controller Area Network (sensor CAN® bus) 80 using a vehicle Local Area Network (LAN).

The steering control unit 50, the throttle control unit 60, and the brake control unit 70 are connected with the vehicle ECU 40 via a vehicle CAN bus 82 using a vehicle LAN.

The image processing device 100 according to an embodiment of this disclosure is installed in the above-described parking assist apparatus 1 and is configured mainly with the camera ECU 22.

Functional Configuration of Image Processing Device

Figure 3:
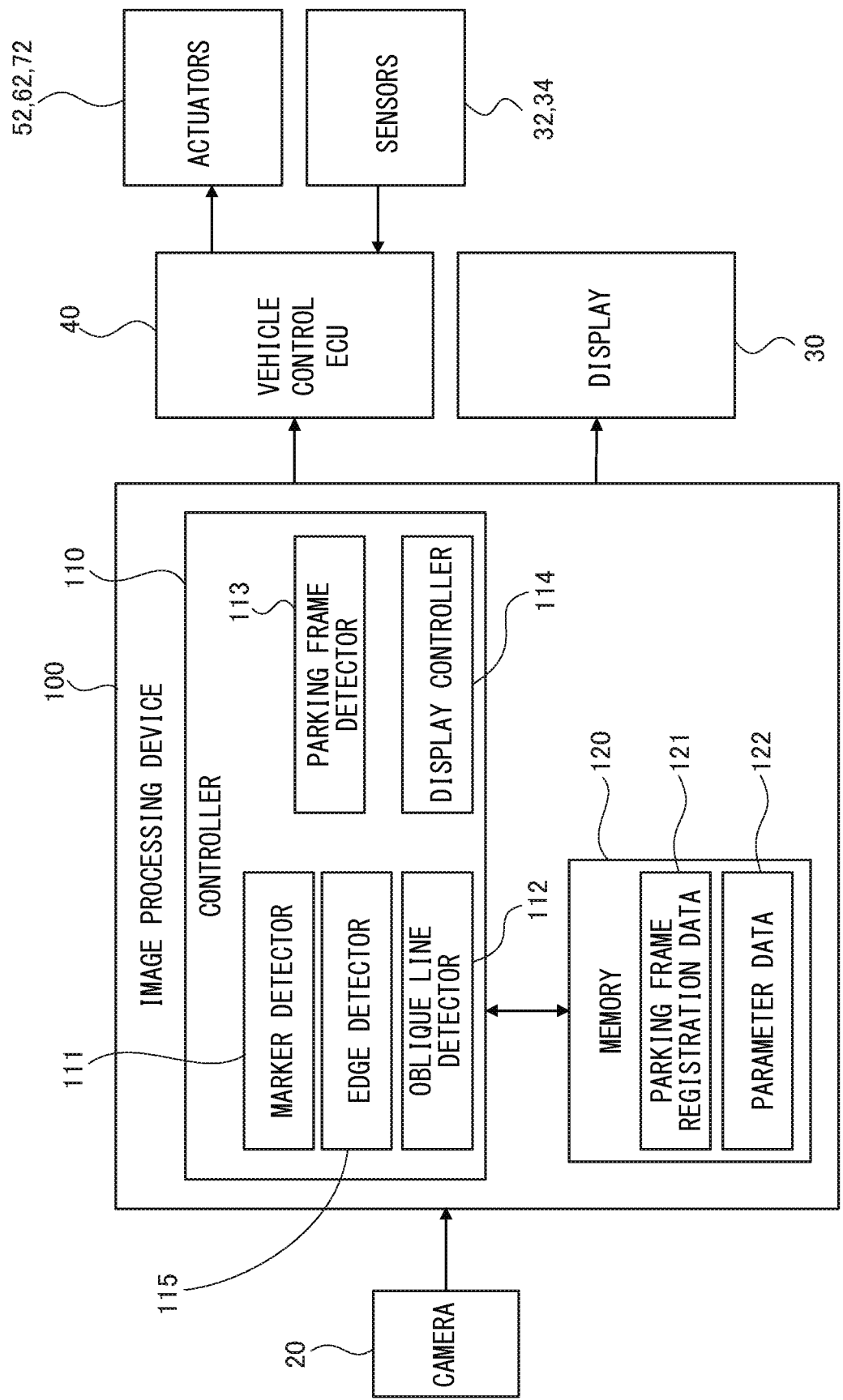
FIG. 3 is a functional block diagram showing a schematic configuration of the image processing device according to an embodiment of the present disclosure.

As illustrated in FIG. 3, the image processing device 100 includes a controller 110 and a memory 120. The controller 110 is configured mainly with the CPU (processor) of the camera ECU 22.

The controller 110 controls the entire image processing device 100. Additionally, the controller 110 transmits information required for the automatic parking process (e.g., parking space, and position and shape of the parking frame) to the vehicle ECU 40 in order to allow the vehicle ECU 40 to automatically park the vehicle V in the available parking frame. It should be noted that, as described later, the controller 110 determines the availability of the parking frame based on a parking space and/or a marker that divides the parking space as a border line. Such a marker and a parking space are detected or estimated by a marker detector 111, an oblique line detector 112, and a parking frame detector 113.

The vehicle ECU 40 controls the steering actuator 52, the throttle actuator 62, and the brake actuator 72 based on the information obtained from the controller 110 as well as the information detected by the wheel speed sensor 32 and the steering angle sensor 34.

The controller 110 includes arithmetic elements consisting of an integrated circuit such as an ASIC or a programmable logic device such as a CPU and an FPGA.

The memory 120 of the image processing device 100 stores a computer-readable program. The program is run by the controller 110 in response to an activation of the image processing device 100, such that the image processing device 100 realizes the functional configuration as illustrated in FIG. 3. As the image processing device 100 of the embodiment is expected to carry out high-speed image processing, it is preferable to have arithmetic elements suitable to high-speed computing, such as an FPGA.

The controller 110 includes the marker detector 111, an oblique line detector 112, the parking frame detector 113, a display controller 114, and an edge detector 115.

The marker detector 111 performs edge detection based on the image signals outputted from the cameras 20 and detects a parking space division marker that defines a parking space on a road. Here, the "parking space division marker" is a border line (i.e., straight line) that defines a parking space on a road and is generally a white line. However, the parking space division marker may be a line having a different color such as yellow. Therefore, the parking space division marker that is detected by the marker detector 111 is not limited to a white line. The marker detector 111 is configured to detect a border line (i.e., straight line) having a contrast with respect to the road surface.

With the edge detector 115, the marker detector 111 detects an edge in an image generated from the image signals. The edge detector 115 scans the image in a predetermined direction and detects a position at which an image signal changes by a preset value or more as an edge. It is preferable for the edge detector 115 to detect an edge based on a luminance pattern of or a density pattern of the image signals. When scanning, the edge detector 115 selects pixels one by one in the predetermined direction and compares signal intensities between the neighboring pixels.

Figure 5:
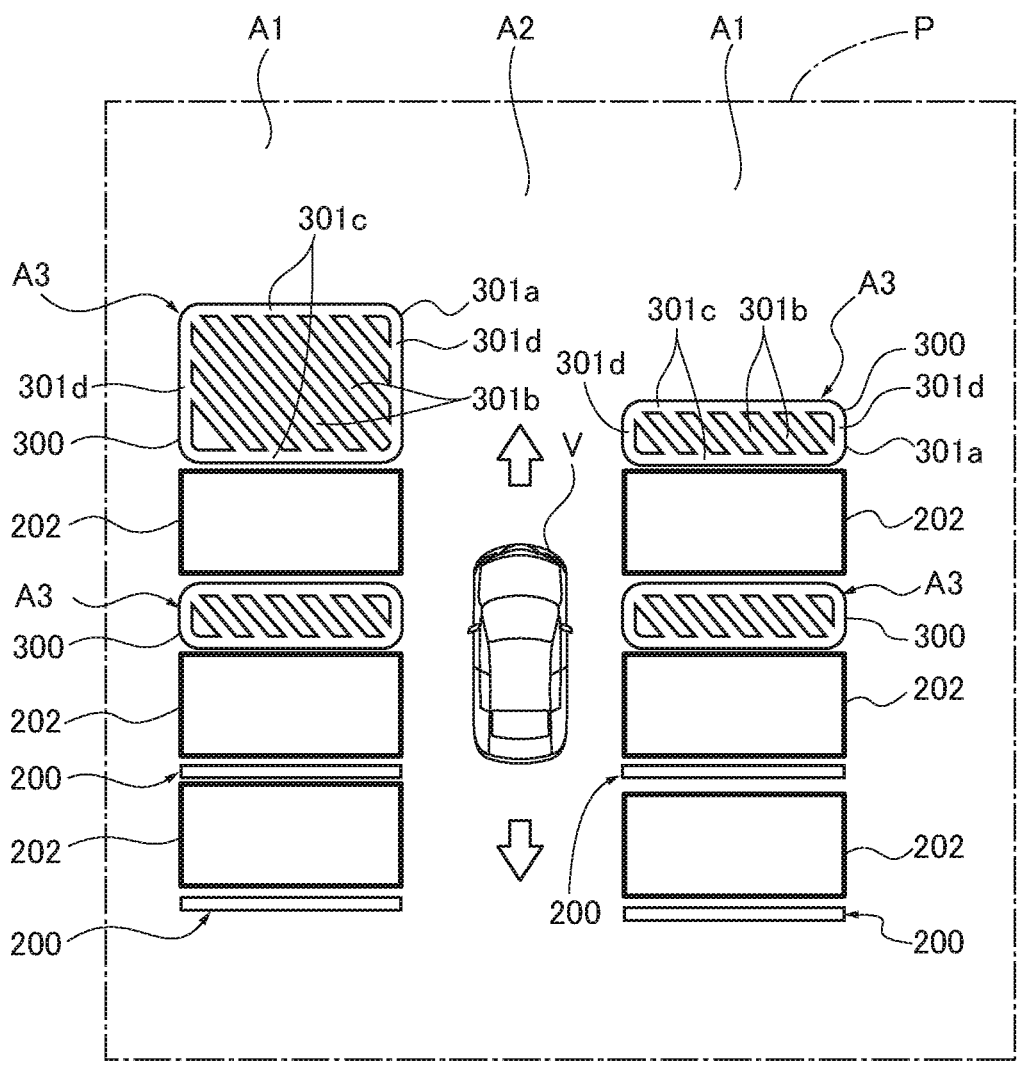
FIG. 5 is an explanatory view for explaining operations performed by the image processing device according to an embodiment of the present disclosure.
Figure 6:
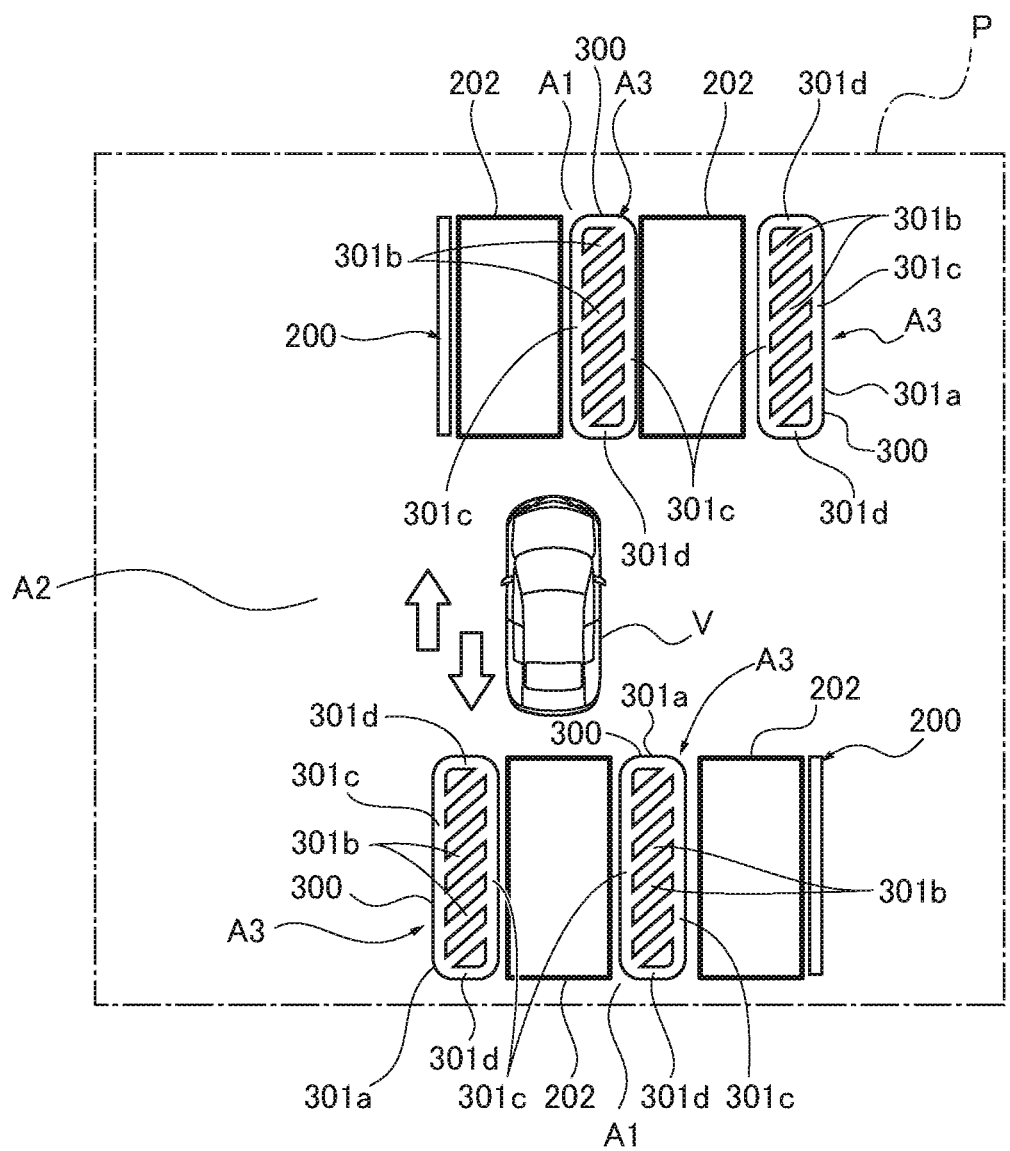
FIG. 6 is an explanatory view for explaining operations performed by the image processing device according to an embodiment of the present disclosure.

It is preferable to select a direction orthogonal to the parking space division marker as the scanning direction. For example, when the parking space division marker 200 extends in a direction orthogonal to the traveling direction of the vehicle V as illustrated in FIG. 5, the scanning direction is preferably set to the direction parallel to the traveling direction. When the parking space division marker 200 extends in the direction parallel to the traveling direction of the vehicle V as illustrated in FIG. 6, the scanning direction is preferably set to the direction orthogonal to the traveling direction. Since the extending direction of the parking space division marker may not be known in advance, the marker detector 111 may be configured to control the edge detector 115 to scan an image both in the parallel direction and in the orthogonal direction to the traveling direction of the vehicle V.

The marker detector 111 extracts positions of a positive edge (also referred as "rising edge") and a negative edge (also referred as "falling edge") of an image signal from the edges detected by the edge detector 115. Here, the image signal increases by a predetermined value or more at the positive edge, and the image signal decreases by a predefined value or more at the negative edge. In this disclosure, a positive edge may be referred to as a "first edge", and a negative edge as a "second edge" in this disclosure. It should be noted that the predetermined value for the positive edge and the predefined value for the negative edge may be identical to each other or may be different from each other.

When extracting an edge based on a luminance value, the positive edge means an edge at which the pixel changes from a pixel having a low luminance (e.g., black pixel) to a pixel having a high luminance (e.g., white pixel). This means, a scanning position may be switched from a road surface to a candidate of a parking space division marker at the position corresponding to the position edge. On the other hand, the negative edge means an edge at which the pixel changes from a pixel having a high luminance to a pixel having a low luminance. This means, a scanning position may be switched from a candidate of a parking space division marker to a road surface at the position corresponding to the negative edge.

When extracting an edge based on a gray level or a grayscale, a road surface generally has a higher density and a parking space division marker has a lower density. Therefore, an edge at which the pixel changes from a pixel having a high density to a pixel having a low density should be recognized as the positive edge. On the other hand, an edge at which the pixel changes from a pixel having a low density to a pixel having a high density should be recognized as the negative edge. It should be noted that when a parking space division marker has a lower luminance (or higher density) than a road surface, the changes in the luminance value and the density value are reversed. In either instance, both a positive edge and a negative edge are detected on the both sides of a parking space division marker.

By carrying out the scanning processes for a plurality of lines, a positive edge segment formed by sequentially connecting the detected positive edges in the direction orthogonal to the traveling direction is extracted. Similarly, a negative edge segment formed by sequentially connecting the detected negative edges is extracted. The marker detector 111 applies a filtering process on the extracted positive edge segment and negative edge segment with respect to a reference length $L_R$. With this, the segments shorter than the reference length $L_R$ are removed therefrom. Additionally, the marker detector 111 may apply the filtering process on the segments with respect to an angle thereof.

The marker detector 111 then calculates the position (coordinate) of each endpoint of the filtered positive edge segments and the filtered negative edge segments. The marker detector 111 extracts a pair of a positive edge segment and a negative edge segment based on the calculated positions. The paired positive edge segment and negative edge segment are aligned next to each other at a predetermined interval. The marker detector 111 then determines a straight line defined by the paired positive edge segment and negative edge segment as a parking space division marker. That is, when the distance between the positive edge segment and the negative edge segment aligned next to each other is within a range of a predetermined line width W±a permissible error, the subject positive edge segment and the subject negative edge segment are recognized as a part of a parking space division marker. Therefore, the straight line defined by the paired edge segments is recognized as a parking space division marker.

Here, the line width W means a width of the parking space division marker. In general, the line width is about 15 to 20 cm, but the width of a parking space division marker may be over 30 cm depending on a parking lot. Therefore, it is preferable to store several line widths of parking space division markers in the memory 120 as parameter data 122, and the appropriate line width should be selected in accordance with the parking lot.

The oblique line detector 112 selects, from the detected positive edge segments and the detected negative edge segment, an edge segment that is not extracted as a pair. The oblique line detector 112 then defines the selected edge segment as a "single-edge segment" and temporally records the defined single-edge segment in the memory 120. With the edge detector 115, the oblique line detector 112 scans an image from any start point on one side of the single-edge segment in the direction along the single-edge segment. With this scanning process, the oblique line detector 112 detects an existence of an oblique line (i.e., line declined with respect to scanning direction). When an oblique line is detected along the single-edge segment, the marker detector 111 detects a straight line based on the single-edge segment and assigns the detected straight line as a "presumed straight line" (straight line 301c in FIG. 5, etc.). The presumed straight line forms a part of a marker having the oblique line (e.g., no-parking/stopping marker 300 in FIG. 5, etc.) and may be used as a parking space division line.

For example, the oblique line detector 112 compares the pixels along the single-edge line based on the luminance pattern of the image signals and determines whether the luminance values alternatively change between a high luminance value and a low luminance value at a predefined interval to detect an oblique line. The oblique line detector 112 of this embodiment is configured to detect at least one change in the luminance value. However, the oblique detector 112 may be configured to detect more than one change in the luminance values to improve the detection accuracy of the no-parking/stopping area as the plurality of changes in the luminance values may represent a plurality of oblique lines. The number of or/and the interval of such changes to be detected is preferably stored in the memory 120 as one of the parameter data 122. Instead of the above, a scanning distance (i.e., pixels to be scanned) may be stored in the memory 120 such that the oblique line detector 112 detects the changes in the luminance values in accordance with the distance. Further, the oblique detector 112 may be configured to scan more than one single-edge segment to improve the detection accuracy of the no-parking/stopping area. It should be noted that the oblique detector 112 may be configured to compare the pixels based on the density pattern of the image signals and to determine whether the density values alternatively change between a high-density value and a low-density value so as to detect an oblique line.

In this disclosure, the term "one side" of a single-edge segment means the side having a higher possibility to have an oblique line. To be specific, the side having a higher luminance value or a lower density value is selected as the "one side" of the single-edge segment.

From the positive and negative edge segments of the parking space division marker 200 detected by the marker detector 111 as well as the single-edge segment of the presumed straight line, the parking frame detector 113 selects edge segments that are aligned next to each other (may also be referred to as "neighboring edge segments") and has a possibility to form a parking space. The parking frame detector 113 then detects a parking space based on the distances between the selected edge segments.

To be specific, the parking frame detector 113 first selects, from the paired positive and negative edge segments of a plurality of parking space division markers 200, two neighboring edge segments that have a possibility to form a parking space. The selected two edge segments form one side of a parking space division line and one side of another parking space division line and define a parking space. In the embodiment shown in FIG. 8, the selected two edge segments are the negative edge line (Em3) of the first parking space division marker (denoted as K1 in FIG. 8) and the opposed positive edge line (Ep4) of another parking space division marker (denoted as K2 in FIG. 8).

The parking frame detector 113 then calculates the distance between the selected two edge segments (i.e., internal dimension of the neighboring parking space division markers 200) based on the coordinate value of each end point of the selected edge segment. When the calculated distance is within a range of a prescribed distance L±a permissible error, the area defined by the selected edge segments is detected as a parking space. Preferably, the prescribed distance L is set to 2-3 meter for parking spaces of standard sized vehicles and small trucks, and is set to 3.3 meter or more for parking spaces of large trucks and busses.

The parking frame detector 113 selects the single-edge segment of the presumed straight line detected by the oblique line detector 112. Further, the parking frame detector 113 selects the positive edge segment or the negative edge segment of the parking space division marker 200 next to the selected single-edge segment, or selects the single-edge segment of another presumed straight line next thereto. When the distance between the selected edge segments is within the range of the prescribed distance L±the permissible error, the parking frame detector 113 detects the area between the selected edge segments as a parking space.

Here, in order to detect an edge segment next to the single-edge segment of the presumed straight line, the parking frame detector 113 searches an area in the opposite direction to an oblique line 301b of the no-parking/stopping marker 300. That is, the parking frame detector 113 searches for an edge segment in the area having a lower luminance value (i.e., road surface). This process prevents the no-parking/stopping area A3 (e.g., area surrounded by the line segment Ep1 and Em1 or by the line segment Ep2 and Em2 in FIG. 8), from mistakenly being detected as a parking space.

The parking frame detector 113 then estimates the shape of the parking frame (i.e., parking frame 202 illustrated in FIG. 5) based on the detected parking space and registers the coordinate values of the estimated parking frame in the memory 120 as registration data of parking frame (hereinafter, referred to as "parking frame registration data 121").

The display controller 114 sends a display control signal to the navigation device 30 in order to display an image of the road surface around the subject vehicle V, which is captured by the cameras 20, and/or an image of the parking frame detected and estimated by the parking frame detector 113 on the monitor 31 of the navigation device (display) 30. Here, the display controller 114 is capable of displaying the image of the parking frame on the monitor 31 solely or together with the image of the road surface.

The memory 120 is equipped with a mass storage medium (e.g., hard disc drive) and other storage mediums (e.g., semiconductor storage medium such as ROM, and RAM). The memory 120 stores various types of data/information used by the controller 110 temporally or non-temporally.

As described above, the memory 120 stores the parking frame registration data 121 and the parameter data 122. The parameter data 122 is used by the marker detector 111, the oblique line detector 112, the parking frame detector 113, and the edge detector 115. For example, the predetermined line width W and the reference length $L_R$ of a parking space division marker 200, an angle D (described later) indicating a direction of a parking space division marker 200, the prescribed width of a parking space (i.e., prescribed distance L of parking space division marker 200), the coordinate value of a scanning start point S for detecting an oblique line with the oblique line detector 112, a width of an oblique line, and the permissible errors thereof are stored in the memory 120 as the parameter data 122. The parameter data 122 should be modified depending on the country or region in which the parking assist apparatus 1 is used, as well as depending on, for example, the shapes and sizes of the parking space (or of the parking frame), and the line widths, lengths, and angles of the parking space division markers 200. The memory 120 may further store a plurality of parameters depending on the markers used. With this, the controller 110 is able to select appropriate parameters in accordance with the subject parking lot in which a parking space is detected.

Operations of Image Processing Device

An example of the operations performed by the image processing device 100 according to an embodiment of this disclosure will be described with reference to the flowchart of FIG. 4 and FIGS. 5-9.

Figure 4:
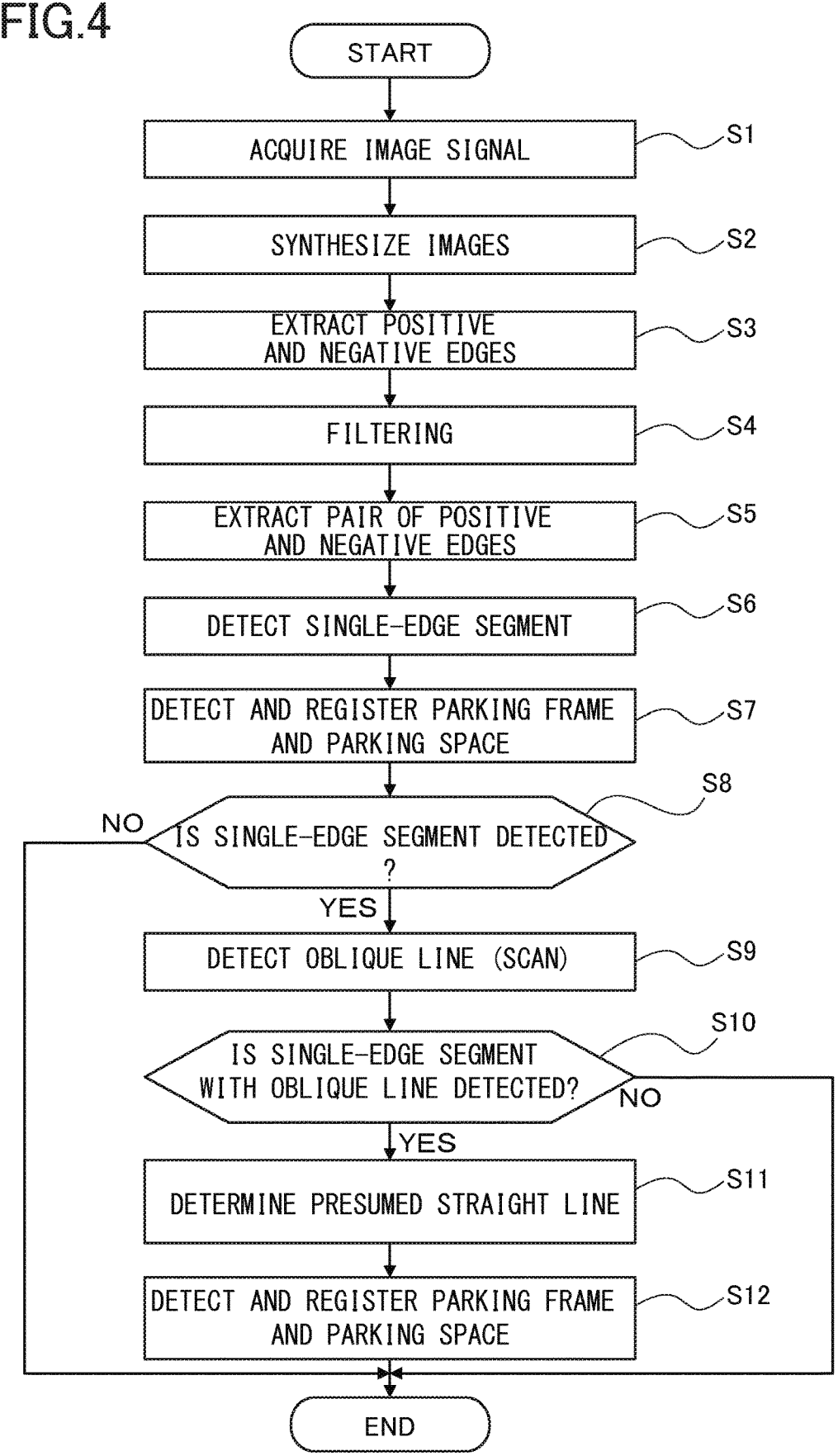
FIG. 4 is a flowchart for explaining an example of operations performed by the image processing device according to an embodiment of the present disclosure.

FIG. 4 is a flowchart for explaining operations performed by the image processing device 100. The operations shown in the flowchart of FIG. 4 are initiated when a driver presses a switch to input a command for starting the automatic parking through a switch.

In Step S1, the controller 110 of the image processing device 100 acquires image signals of a road surface around the subject vehicle V. The image signals of the road surface are obtained by the cameras 20.

In Step S2, the controller 110 generates a synthesized image by synthesizing the image signals acquired in Step S1. The synthesized signals generated in Step S2 are used by the navigation device 30 to display an overhead image. The overhead image allows the driver to look down the subject vehicle V from the air above the vehicle V. A method for generating such as an overhead image has been known, and is taught by, for example, JP1991-99952A and JP2003-118522A.

It should be noted that the image-synthesizing process may be carried out after extracting a positive edge and a negative edge in Step S3. However, it is preferable to generate an overhead image prior to extracting positive and negative edges since it reduces the processing load of the image processing device 100.

In Step S3, the marker detector 111 scans, as described above, the synthesized image generated in Step S2 in a predetermined direction and extracts a positive edge and a negative edge in the image based on the luminance values of the image signals.

Here, an example of markers drawn on the road surface of a parking lot will be described with reference to FIG. 5. The parking lot P of FIG. 5 has a parking area A1, a passage area A2, and a no-parking/stopping area A3. The parking area A1 is a space in which a vehicle V is parked. The passage area A2 is a space in which a vehicle V passes through. The no-parking/stopping area A3 is a space in which a vehicle V is not allowed to enter, stop, and park. As the no-parking/stopping area A3 is indicated by oblique lines, the area A3 may also be referred to as an "oblique line area" or/and a "zebra zone". A plurality of markers such as parking space division markers 200 and no-parking/stopping markers 300 are drawn on the road surface of the parking lot P to divide the parking area A1, the passage area A2, and the no-parking/stopping area A3 from each other.

The parking space division markers 200 in FIG. 5 extends in a direction crossed with the traveling direction of the vehicle V in the passage area A2 (traveling direction is shown by arrows in FIG. 5). In the example shown in FIG. 5, the parking space division markers 200 extend in a direction substantially orthogonal to the traveling direction.

The no-parking/stopping markers 300 in FIG. 5 include a circumferential line 301a, which surrounds the no-parking/stopping area A3, and a plurality of oblique lines 301b, which are drawn inside the circumferential line 301a. The circumferential line 301a is formed by two straight lines 301c extending along the parking space and one or two linking line(s) 301d connecting the end points of the straight lines 301c. In FIG. 5, the two straight lines 301c extend in the direction substantially orthogonal to the traveling direction of the vehicle V. The plurality of oblique lines 301b are drawn between the two straight lines 301c and are declined with respect to the straight lines 301c.

In FIG. 5, the no-parking/stopping markers 300 have a substantially rectangular shape. However, the shape of the markers 300 is not limited thereto. In accordance with the shape of the parking lot P, the no-parking/stopping markers 300 may have a different shape, such as a triangular shape, a semicircular shape, and an oval shape. So long as the no-parking/stopping markers 300 include at least one straight line 301c and a plurality of oblique lines 301b extending diagonally from the straight line 301c, it is possible to define a parking space. That is, another straight line 301c and a linking line 301d are not necessary to define a parking space. Also, a straight line 301c and a linking line 301 do not necessarily extend along or orthogonal to the traveling direction. These lines may be inclined with respect to the traveling direction or may be curved.

The parking space to park the vehicle V is defined in the area between the neighboring markers 200, 300. The frame surrounding the parking space is defined as the parking frame 202. In the embodiment, the parking frame 202 has a rectangular shape that substantially circumscribes the outer shape of the vehicle V in the overhead view. The parking frame 202 is illustrated in FIG. 5 for convenience of explanation. However, a parking frame 202 is not generally drawn on a road surface in a parking lot P. Therefore, in order to assist the vehicle V to be parked in the parking frame 202, the parking assist apparatus 1 is configured to properly and reliably detect the parking space division marker 200 and the straight line 301c of the no-parking/stopping markers 300 drawn on the road surface and to recognize the parking frame 202 based on the detected markers 200 and the detected straight line 301c.

Figure 7:
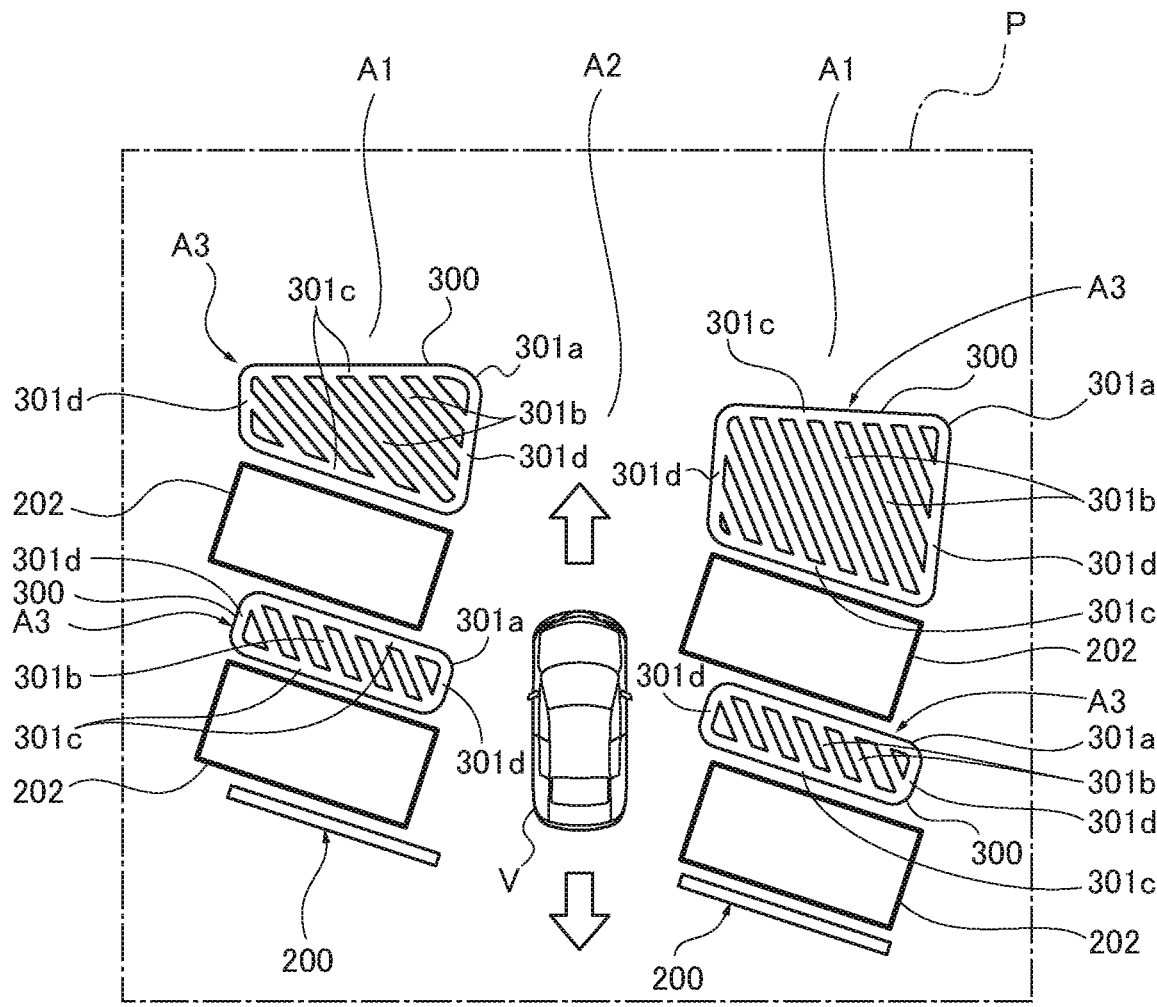
FIG. 7 is an explanatory view for explaining operations performed by the image processing device according to an embodiment of the present disclosure.

FIG. 6 shows a parking lot P in which the parking space division markers 200 and the no-parking/stopping markers 300 as well as the parking frames 202 extend in the direction parallel to the traveling direction of the vehicle V. FIG. 7 shows a parking lot P in which the parking space division markers 200 and the no-parking/stopping markers 300 as well as the parking frames 202 are inclined with respect to the traveling direction of the vehicle V. Nevertheless, by utilizing the image signals acquired by the plurality of cameras 20 or the overhead image obtained by synthesizing the image signals, the image processing device 100 of this embodiment is able to detect the parking spaces and the parking frames 202 nearby the vehicle V accurately.

Figure 9A:
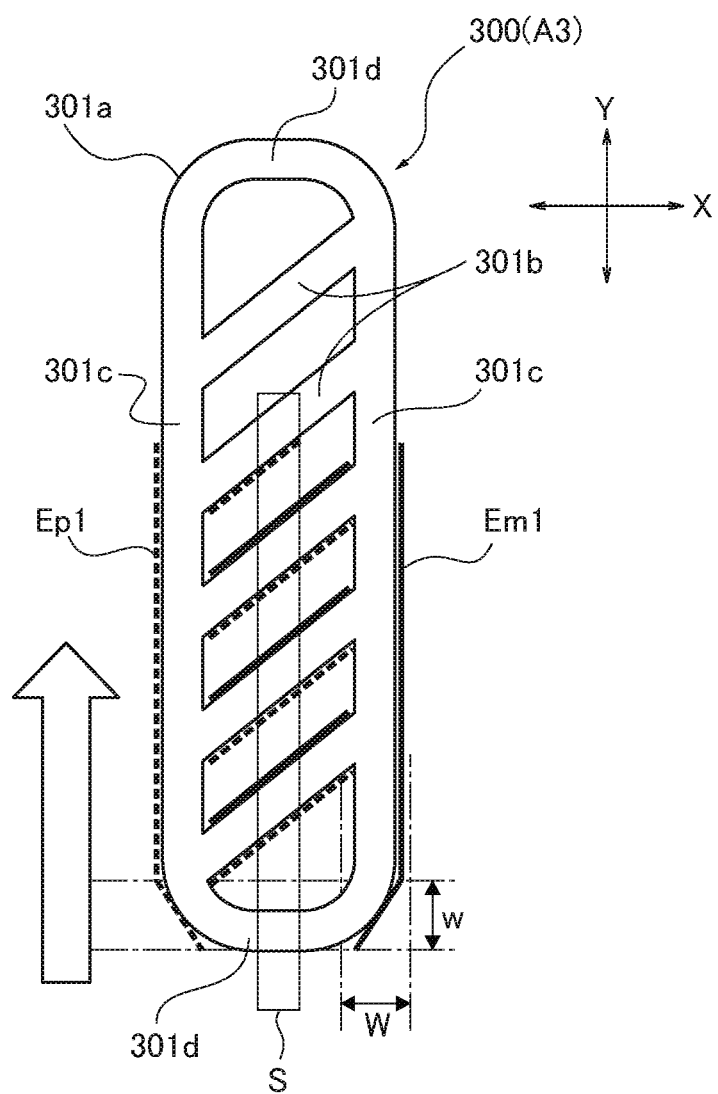
FIG. 9A and FIG. 9B are explanatory views for explaining operations performed by the image processing device according to an embodiment of the present disclosure.

The operations of the marker detector 111 for detecting an edge in the image containing the parking space division markers 200 and the no-parking/stopping markers 300 as shown in FIG. 5 will be described in detail with reference to FIG. 8 and FIG. 9A. FIG. 8 is an enlarged view of the parking area A1 in FIG. 5. FIG. 9A is an enlarged view of the no-parking/stopping marker 300 in FIG. 8.

As exemplarily illustrated in FIG. 8, the X-axis is defined as the direction parallel to the traveling direction of the vehicle V (i.e., direction orthogonal to parking space division markers 200), and the Y-axis is defined as direction parallel to the parking space division markers 200. The marker detector 111 controls the edge detector 115 to scan a predetermined detection range O in the direction orthogonal to the parking space division markers 200 and the straight lines 301c as shown by the arrow (i.e., in positive direction of X-axis). With this, the edge detector 115 detects a positive edge and/or a negative edge in the image.

In FIG. 8, the detected positive edges are shown by bold broken lines, and the detected negative edges are shown by bold solid lines. As illustrated in FIG. 8, the positive edge segment Ep1, Ep2 is detected on the left side of each of the straight lines 301c of each of no-parking/stopping markers 300. On the other hand, the negative edge segment Em1, Em2 is detected on the right side of each of the straight lines 301c of each of the no-parking/stopping markers 300. That is, the positive edge segments Ep1, Ep2 and the negative edge segments Em1, Em2 are detected on the circumferential parts of the straight lines 301c of the no-parking/stopping markers 300. Also, the positive edge segments Ep3, Ep4 are detected on the left side of the parking space division markers 200, and the negative edge segments Em3, Em4 are detected on the right side thereof. Additionally, short-positive edges and short-negative edges are detected on both sides of the oblique lines 301b of the no-parking/stopping markers 300, on the inner sides of the straight lines 301c, and the corners between the straight lines 301c and the linking lines 301d. The edge detector 115 may also detect, as noise, an edge caused due to light reflection on the road surface or/and trash or dirt. It should be noted that when the edge detector 115 scans the image in the opposite direction (i.e., negative direction of X-axis), the positive edges and the negative edges are detected in reverse.

Referring back to FIG. 4, in Step S4, the marker detector 111 filters the positive edge segments and the negative edge segments detected in Step S3 based on the parameters related to the parking space division lines (e.g., reference length $L_R$ and angle D) stored in the memory 120 as the parameter data 122. The filtering process may be carried out after extracting a pair in Step S5 (described later). However, it is preferable to carry out the filtering process to remove noise prior to extracting a pair since it accelerates the image processing.

The marker detector 111 first extracts a positive edge segment and a negative edge segment that has a length equal to or longer than the reference length $L_R$ and that extends in the direction of the angle D. The reference length $L_R$ may be set, for example, equal to the vehicle length of the vehicle V (e.g., 5 meter). Alternatively, the reference length $L_R$ may be set to a length shorter than the vehicle length when the marker detector 111 scans the detection range O shown in FIG. 8. The angle D is determined in accordance with the traveling direction of the vehicle V, the imaging direction of the cameras 20, and the like. For example, in the embodiment shown in FIG. 5, the angle D is set to 90 degrees since the parking space division markers 200 extend orthogonal to the traveling direction.

With the extraction process, the edges having a predetermined length and extending in a predetermined direction are extracted (see edges enclosed by rectangular marks in FIG. 8). That is, the edge segments corresponding to the both sides of the parking space division markers 200 (i.e., edge segments Ep3, Ep4, Em3, Em4) and the edge segments corresponding to the circumferential parts of the straight lines 301c of the no-parking/stopping markers 301 (i.e., line segments Ep1, Ep2, Em1, Em2) are extracted through the process. On the other hand, the short edges detected on the both sides of the oblique lines 301b, on the inner sides of the straight lines 301, and the corners between the straight lines 301c and the linking lines 301d are not extracted through the process and are discarded. Also, the short edges detected due to light reflection on the road surface or/and trash or dirt, the long edges extending in a direction other than the direction orthogonal to the traveling direction are not extracted through the process and are discarded as noise.

In the next step S5, the marker detector 111 selects or extracts, from the extracted edge segments, a pair of the positive edge segment and the negative edge segment. To be specific, the marker detector 111 calculates, based on the image, a distance between a positive edge segment and a neighboring negative edge segment (i.e., widths W1, W2, W3, W4 shown in FIG. 8), and recognizes these positive edge segment and the negative edge segment as a pair when the calculated distance is within the range of the predetermined line width W±the permissible error. As a result, the marker detector 111 detects the parking division marker 200 based on the extracted pairs.

In the embodiment shown in FIG. 8, the widths W3, W4 are equal to the predetermined line width W. Therefore, the positive edge segment Ep3 and the negative edge segment Em3, as well as the positive edge segment Ep4 and the negative edge segment Em4 are extracted as pairs, respectively. As a result, the parking space division markers 200 (K1, K2) are detected. As the widths W1 and W2 are greater than the predetermined line width W, the positive edge segment Ep1, the negative edge segment Em1, the positive edge segment Ep2, and the negative edge segment Em2 are not extracted as a pair.

In Step S6, the marker detector 111 temporally registers the positive edge segments and the negative edge segments that are not extracted as a pair into the memory 120 as "single-edge segments".

In Step S7, the parking frame detector 113 detects a parking space and a parking frame based on the parking space division markers 200 extracted in Step S5. That is, as described above, the parking frame detector 113 calculates a distance between a positive edge segment and an opposed negative edge segment of neighboring parking division markers 200. In the embodiment of FIG. 8, the parking frame detector 113 calculates a distance between the negative edge segment Em4 of the parking division marker 200 (K1) and the positive edge segment Ep 4 of the parking division marker 200 (K2). When the calculated distance is within the range of the prescribed distance L±the permissible error, the parking frame detector 113 determines that the space between the parking space division markers 200 is a parking frame. In the embodiment shown in FIG. 8, the distance L1 is equal to the prescribed distance L, and thus the space therebetween is detected as a parking space. The parking frame detector 113 then estimates a parking frame 202 that is formed by the long lines extending along the positive edge segment and the opposed negative edge segment as well as the short lines connecting the corresponding end points of the long lines.

The parking frame detector 113 calculates the coordinate values of the end points of the positive edge segment and the opposed negative edge segment that form each of the parking frame 202, and registers the calculated coordinate values in the memory 120 as the parking frame registration data 121. It should be noted that the parking frame detector 113 may register only the coordinate values of the two end points of the parking frame 202 positioned close to the passage area A2 to save the memory capacity. The parking frame detector 113 may also register the angle D of the parking space division markers 200 into the memory 120 as the angle of the parking frame 202.

In Step S8, the image processing device 100 determines whether a single-edge segment has been detected. When the determination is affirmative (i.e., YES), the process proceeds to Step S9. When the determination is negative (i.e., NO), the image processing device 100 determines that all of the parking spaces have been detected and registered in the memory 120 and thus terminates the process by omitting Steps S9-S12.

In Step S9, the oblique line detector 112 detects an oblique line 301b in order to determine whether an oblique line exists around the single-edge segment detected in Step S6. When an oblique line 301b exists around the single-edge segment, the oblique line detector 112 determines that the single-edge segment represents a straight line 301c of a no-parking/stopping marker 300 in the no-parking/stopping area A3. On the other hand, when an oblique line does not exist around the single-edge segment, the oblique line detector 112 determines that the single-edge segment is a noise caused by, for example, light reflection on the road surface.

An example of the detailed process in Step S9 for detecting an oblique line 301b will be described with reference to FIG. 9A. When the single-edge segment represents an edge of the straight line 301c of the no-parking/stopping marker 300, an oblique line must exist at a point where the luminance value changes from a low value to a high value. That is, an oblique line 301b exists on the right side (i.e., in positive direction of X-axis) of a single-edge segment if the single-edge segment is a positive edge segment (e.g., line segment Ep1). Similarly, an oblique line 301b exists on the left side (i.e., in negative direction of X-axis) of a single-edge segment if the single-edge segment is a negative edge segment (e.g., line segment Em1). Therefore, a scanning start point S is preset at a position on the right side of a positive edge segment or on the left side of a negative edge segment, and the oblique line detector 112 is configured to scan the pixels from the preset scanning start point S toward a direction in which the oblique lines 301b exist (i.e., in positive direction of Y-axis in FIG. 9A). The bold broken lines shown along the outer edges of the oblique lines 301b in FIG. 9A represent the positive edge segments, and the bold solid lines represent the negative edge segments when the oblique line detector 112 carries out the scanning process in the Y-axis direction.

The coordinate value of the scanning start point S is determined as a relative value with respect to the end point of the single-edge segment and is stored in the memory 120 as the parameter data 122. For the no-parking/stopping marker 300, the oblique lines 301b exist between the straight lines 301c. Therefore, the X coordinate value of the scanning start point S is determined such that the distance between the scanning start point S and the end point of the single-edge segment is longer than the predetermined line width W of the straight line 301c. Further, the Y coordinate value of the scanning start point S is determined such that the scanning start point S is located outside (i.e., in negative direction of Y-axis) the no-parking/stopping marker 300 and the distance from the end point of the single-edge segment to the scanning start point S is longer than the distance from the end point of the single-edge segment to the outer circumferential edge of the linking line 301d.

Figure 9B:
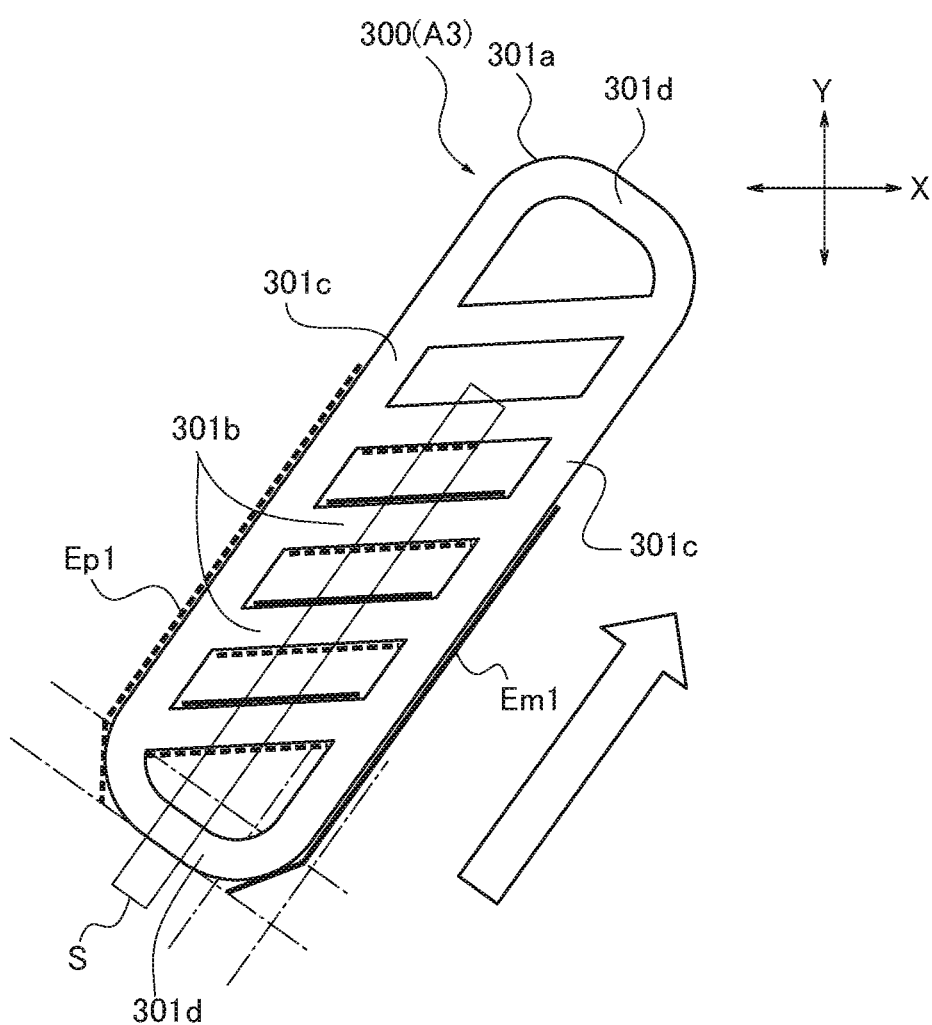

FIG. 9B shows a scanning start point S and a scanning direction when the straight line 301c of the no-parking/stopping marker 300 is inclined with respect to the Y-axis. In FIG. 9B, the scanning start point S is determined based on the end point of the single-edge segment and the inclined angle of the single-edge segment with respect to the Y-axis. The oblique line detector 112 carries out the scanning process from the scanning start point S in the extending direction of the single-edge segment. Accordingly, the oblique line detector 112 is able to detect the existence of an oblique line 301b accurately.

When the luminance values change alternatively and repeatedly, for example, from a low value (i.e., black) to a high value (i.e., white), and from a high value to a low value at the predefined interval, the oblique line detector 112 determines that the oblique lines 301b exist. When the luminance value does not change, the oblique line detector 112 determines that the oblique line 301 does not exit.

Referring back to FIG. 4, in Step S10, the oblique line detector 112 determines, based on the scanning results in Step S9, whether the detected oblique line 301b is connected with a single-edge segment. When it is determined that there is a single-edge segment connected with the detected oblique line 301b (i.e., YES), the process proceeds to Step S11. When it is determined that there is no single-edge segment connected with the detected oblique line 301b, the detected single-edge segments are discarded as noise and the process is terminated by omitting the Steps S11 and S12.

In Step S11, the oblique line detector 112 presumes the single-edge segment connected with the oblique lines 301b as an edge segment forming the straight line 301c of the no-parking/stopping marker 300. The oblique line detector 112 then detects the straight line 301c based on the presumed single-edge segment and assigns the straight line 301c as a "presumed line".

In Step S12, the parking frame detector 113 detects a parking space and a parking frame 202 based on the presumed straight line 301c assigned in Step S11. That is, the parking frame detector 113 searches one side of the single-edge segment of the straight line 301c (specifically, the side opposite to the oblique lines 301b with respect to the straight line 301c) to detect a neighboring parking space division marker 200 or a neighboring straight line 301c. Similar to the process in Step S7, the parking frame detector 113 calculates a distance between the single-edge segment and the opposed edge segment. The parking frame detector 113 then determines the area between the edge segments as a parking space when the calculated distance is within the range of the prescribed distance L±the permissible error. The parking frame detector 113 applies the process only on the single-edge segment that is connected with the detected oblique line 301b. In the embodiment of FIG. 8, the parking frame detector 113 detects parking spaces between the negative edge segment Em1 (single-edge segment) and the positive edge segment Ep2 (single-edge segment) as well as between the negative edge segment Em2 and the positive edge segment Ep3 of the parking space division marker 200, respectively.

The parking frame detector 113 then estimates a parking frame 202. To be specific, the parking frame detector 113 assigns the lines along the positive edge segment and the opposed negative edge segment, which form the detected parking space, as the long lines of the parking frame 202. The parking frame detector 113 also assigns the lines connecting the end points of the long lines as the short lines of the parking frame 202, and estimates the rectangular shape formed by the assigned long lines and short lines as the parking frame 202. Accordingly, the image processing device 100 is able to detect the parking frames 202 provided next to the no-parking/stopping areas A3 properly and reliably.

With respect to the detected parking frame 202 that is provided next to the no-parking/stopping area A3, the parking frame detector 113 calculates the coordinate value of each end point of the positive edge segment and the opposed negative edge segment, and registers the calculated coordinate values to the memory 120 as the parameter data 121. It should be noted that the process of Step S7, in which the parking space and the parking frame 202 are detected and registered based on the parking space division markers 200, may alternatively be carried out in this Step S11. However, it is preferable to carry out the process of Step S7 prior to the processes of Steps S8 to S12 since it improves the efficiency of the processes and accelerates the entire image processing speed.

Advantages of Image Processing Device

With the image processing device 100 according to the embodiment described above, the marker detector 111 detects a positive edge segment and a negative edge segment having the predetermined length from a captured image, extracts a pair of edges aligned next to each other at the predetermined interval, and detects a parking space division marker 200 based on the extracted pair. Further, the oblique line detector 112 determines an existence of an oblique line 301b with respect to a single-edge segment that is not extracted as the pair, detects a straight line 301c based on the single-edge segment connected with the oblique line 301b, and defines the detected straight line 301c as a "presumed straight line" which forms the no-parking/stopping marker 300 and may function as a parking space division line. The parking frame detector 113 then detects a parking space based on the detected positive edge segment and the negative edge segment of the detected parking space division marker 200 as well as on the single-edge segment of the presumed straight line.

Accordingly, in addition to a parking space between parking space division markers 200, the embodiment of the disclosure is capable of detecting a parking space located next to a no-parking/stopping area A3 properly and reliably.

It is also possible to detect a no-parking/stopping marker 300 drawn in a no-parking/stopping area A3 with pattern-matting. However, shapes, sizes, and the like of no-parking/stopping areas vary significantly. For example, the no-parking/stopping markers 300 may be formed in a triangular shape, a semicircular shape, or an oval shape. Therefore, it will be necessary to store a plurality of patterns for the matching process and to detect edges depending on the shapes and sizes, thereby taking significant time for arithmetic process. In contrast, the image processing device 100 and the image processing method according to the embodiment is able to reduce the arithmetic process load compared to the pattern matting process. Accordingly, it is possible to detect a parking space provided on a road surface in a parking lot P promptly and reliably.

The oblique line detector 112 is configured to determine the existence of the oblique lines 301b when detecting a rising edge, at which the image signal increases by the predetermined value or more, and a falling edge, at which the image signal decreases by the predefined value or more, at the predefined interval once or more. Accordingly, it is possible to detect the existence of the oblique line 301b promptly and accurately. Further, the oblique line detector 112 is configured, for detecting an oblique line 301b, to scan only the area in which the image signal is higher with respect to the single-edge segment. As a result, it is possible to prevent the no-parking/stopping area A3 from being detected as a parking space incorrectly, thereby improving the detection accuracy of a parking space and achieving a high-speed arithmetic processing.

The marker detector 111 and the oblique line detector 112 are configured to detect an edge based on a luminance pattern of or a density pattern of the image signals. With this, it is possible to detect positive edges and negative edges promptly and accurately.

In the embodiment described above, the image processing device 100 comprises the memory 120, in which the reference length $L_R$ and the predetermined line width W of the parking space division marker 200, the angle D indicating an extending direction of the parking space division marker 200, as well as the prescribed width L for the parking space (i.e., prescribed distance L of the parking space division markers 200) are stored. By storing appropriate values in accordance with, for example, the shape and size of a parking frame 202 in a parking lot P, it is possible to detect a parking frame 202 properly and accurately depending on the parking lot P.

In the no-parking/stopping area A3, an edge at an intersection with an oblique line is detected relatively short. Therefore, if a short edge is registered as an edge representing a straight line, it is difficult to distinguish the registered edge from an edge caused by light reflection and/or trash and dirt (i.e., noise). Here, it may be possible to combine short edges to be a single-edge segment having a predetermined length. However, it may combine edges caused by noise, resulting in decrease in detection accuracy and processing speed of a parking frame.

In contrast, the image processing device 100 of the embodiment is configured to extract only a positive edge segment and a negative edge segment having the predetermined length. With this, it removes short edges that may be generated by noise. Additionally, with respect to the single-edge segment that has the predetermined length but is not extracted as a pair, the image processing device 100 of the embodiment is configured to determine an existence of an oblique line 301b and to detect a presumed straight line based on the single-edge segment connecting with the oblique line 301b. Further, the image processing device 100 is configured to discard a single-edge segment that is not connected with an oblique line 301b. As a result, it improves the detection accuracy of a presumed straight line so as to significantly improve the detection rate of a parking frame 202 provided next to a no-parking/stopping marker 300.

Although the embodiments of the present disclosure have been exemplarily described with reference to the drawings, they should not be limited thereto. It should be appreciated that variations or modifications may be made in the embodiments described by those having skill in the art without departing from the scope of the present invention as defined by the following claims.

For example, the image processing device 100 may determine the difference of the image signals based on the RGB values of the image.

What is claimed is:

1. An image processing device comprising a processor, the processor being configured to:
    scan an image generated by an image signal in a predetermined direction, the image signal being captured by an imaging device for imaging a road surface around a vehicle, detect a first edge segment at which the image signal increases by a predetermined value or more and a second edge segment at which the image signal decreases by a predefined value or more, filter the detected first edge segment and the detected second edge segment with a reference length, extract the filtered first edge segment and the filtered second edge segment that are aligned next to each other at a predetermined interval as a pair, detect a parking space division marker based on the extracted pair, select the filtered first edge segment and the filtered second edge segment that are not extracted as the pair, define the selected edge segment as a single-edge segment, scan the image from a scanning start point on one side of the single-edge segment in a direction along the single-edge segment to determine an existence of an oblique line, detect a straight line based on the single-edge segment connected with the oblique line, assign the detected straight line as a presumed straight line that forms a marker having the oblique line, detect neighboring edge segments aligned next to each other based on the first edge segment and the second edge segment of the parking space division marker as well as the single-edge segment of the presumed straight line, and detect a parking space based on a distance between the detected neighboring edge segments.

2. The image processing device according to claim 1, wherein the processor is configured to determine that the oblique line exists when detecting, at a predetermined interval, an edge segment at which the image signal increases by the predetermined value or more and an edge segment at which the image signal decreases by the predefined value or more at least once.

3. The image processing device according to claim 1, wherein the processor is configured to scan an area in which the image signal is higher with respect to the single-edge segment when detecting the oblique line.

4. The image processing device according to claim 1, wherein the processor is configured to detect the edge segment based on a luminance pattern or a density pattern of the image signal.

5. The image processing device according to claim 1, further comprising a memory that is configured to store the reference length and a line width of the parking space division marker, an angle indicating an extending direction of the parking space division marker, as well as a width of the parking space.

6. An image processing method for detecting a parking space, the method comprising:

scanning an image generated by an image signal in a predetermined direction, the image signal being captured by an imaging device for imaging a road surface around a vehicle, detecting a first edge segment at which the image signal increases by a predetermined value or more and a second edge segment at which the image signal decreases by a predefined value or more, filtering the detected first edge segment and the detected second edge segment with a reference length, extracting the filtered first edge segment and the filtered second edge segment that are aligned next to each other at a predetermined interval as a pair, detecting a parking space division marker based on the extracted pair, selecting the filtered first edge segment and the filtered second edge segment that are not extracted as the pair, defining the selected edge segment as a single-edge segment, scanning the image from a scanning start point on one side of the single-edge segment in a direction along the single-edge segment to determine an existence of an oblique line, detecting a straight line based on the single-edge segment connected with the oblique line, assigning the detected straight line as a presumed straight line that forms a marker having the oblique line, detecting neighboring edge segments aligned next to each other based on the first edge segment and the second edge segment of the parking space division marker as well as the single-edge segment of the presumed straight line, and detecting a parking space based on a distance between the detected neighboring edge segments.

7. The image processing method according to claim 6, further comprising determining an existence of the oblique line when detecting, at a predetermined interval, an edge segment at which the image signal increases by the predetermined value or more and an edge segment at which the image signal decreases by the predefined value or more at least once.

8. The image processing method according to claim 6, further comprising scanning an area in which the image signal is higher with respect to the single-edge segment when detecting the oblique line.

9. The image processing method according to claim 6, further comprising detecting the edge segment based on a luminance pattern or a density pattern of the image signal.

* * * * *